United States Patent [19]

Thomas

[11] Patent Number: 4,690,100

[45] Date of Patent: Sep. 1, 1987

[54] VENTILATED ANIMAL HOUSING AND SERVICE SYSTEM WITH CAGE FILTER COVERS

[75] Inventor: William R. Thomas, Conyngham, Pa.

[73] Assignee: Thoren Caging Systems, Inc., Hazleton, Pa.

[21] Appl. No.: 790,106

[22] Filed: Oct. 22, 1985

[51] Int. Cl.[4] .................................................. A01K 1/03
[52] U.S. Cl. .......................................... 119/15; 119/17
[58] Field of Search ........................ 119/15, 17, 18, 19

[56] References Cited

U.S. PATENT DOCUMENTS

| | | | |
|---|---|---|---|
| 2,988,044 | 6/1961 | Adelberg et al. | 119/15 |
| 3,041,957 | 7/1962 | Liptay | 98/115 LH |
| 3,181,541 | 5/1965 | Brooking | 134/186 |
| 3,301,167 | 1/1967 | Howard et al. | 98/115 LH |
| 3,343,520 | 9/1967 | Schwarz | 119/15 |
| 3,363,539 | 1/1968 | Taylor et al. | 98/115 LH |
| 3,487,766 | 1/1970 | Wood | 98/31 |
| 3,524,431 | 8/1970 | Graham et al. | 119/19 |
| 3,537,428 | 11/1970 | Montgomery | 119/18 |
| 3,830,200 | 8/1974 | Patterson | 119/15 |
| 3,897,721 | 8/1975 | Iuhst | 98/15 R |
| 3,990,398 | 11/1976 | Davis, Jr. | 119/17 |
| 4,016,809 | 4/1977 | Austin | 98/115 LH |
| 4,085,705 | 4/1978 | Gland et al. | 119/17 |
| 4,089,571 | 5/1978 | Landy | 312/1 |
| 4,100,847 | 7/1978 | Morton | 98/115 LH |
| 4,202,676 | 5/1980 | Pelosi et al. | 55/269 |
| 4,249,482 | 2/1981 | Harr | 119/17 |
| 4,252,054 | 2/1981 | Bakels | 98/115 R |
| 4,316,406 | 2/1982 | Lind | 98/40 R |
| 4,343,261 | 8/1982 | Thomas | 119/15 |
| 4,402,280 | 9/1983 | Thomas | 119/15 |
| 4,480,587 | 11/1984 | Sedlacek | 119/15 |
| 4,526,133 | 7/1985 | LoMaglio | 119/15 X |
| 4,528,941 | 7/1985 | Spengler | 119/15 |
| 4,593,650 | 6/1986 | Lattuada | 119/15 |

FOREIGN PATENT DOCUMENTS 0036628 3/1981 Fed. Rep. of Germany .
2065440 12/1980 United Kingdom .

Primary Examiner—Robert P. Swiatek
Attorney, Agent, or Firm—Steele, Gould & Fried

[57] ABSTRACT

An animal housing and service system of the type having impervious cage boxes suspended on brackets from internally-ducted shelves is provided with flat foraminous filter panels disposed across the open tops of the cage boxes, the filter panels remaining in position when the boxes are mounted in the shelves. An independently-ventilated service enclosure is provided for receiving cage boxes, the service enclosure having air direction panels adapted to achieve a downward flow across the cages to be serviced. By keeping the filter panels in place on the cages except when the cage is in the service enclosure, the system achieves the powered ventilation benefits of integrally-ducted shelves and the positive isolation from pathogens of filter covers.

12 Claims, 7 Drawing Figures

VENTILATED ANIMAL HOUSING AND SERVICE SYSTEM WITH CAGE FILTER COVERS

BACKGROUND OF THE INVENTION

1. Field of the Invention

This invention relates to high density animal housing systems, and in particular to housing of laboratory animals for isolation from pathogens, in cage units removably mounted to ventilating shelf racks.

2. Description of Prior Art

In high density animal housing installations, cage occupants must be protected from air-borne dust and dander, which are the vectors for various viruses. To achieve high density the cages are often set on shelves one above another, with the drawback that the dust and dander from cages at the upper shelves naturally falls to the lower shelves, especially as the cages are moved around. Such falling material as well as air-borne dust and dander can rapidly spread disease through a colony of laboratory animals such as mice. Infant mice are especially susceptible to fatalities caused by diarrheal infections spread in this manner.

U.S. Pat. No. 3,343,520—Shwarz, Jr., among other, discloses a filter cover in the form of an inverted box of rigidified filter material, to be disposed over the opened top of an otherwise impervious box-like plastic cage rested on a shelf. Such filter tops may be formed of a compressed fibrous material, bonded together and/or having a resin mixed in for rigidity. Published British patent application No. 2,065,440—Bernardini, discloses a filter cover in which a filter is formed of a flexible sheet and affixed to cover apertures in a rigid cover structure. The cover structure holds the material in a shape of an inverted box, air passing through the top and sides of the inverted box or "filter bonnet".

It is essential in filter covers for free-standing cages to provide sufficient surface area that air flow remains adequate to supply oxygen and to remove harmful vapors such as carbon dioxide and ammonia, which build up in the cage and bedding due to the respiration and urine secretion of the housed animals. More than sufficient air flow capacity is preferable to avoid the need for too-frequent changes as the filter cover material becomes clogged with dust and dander. If ammonia and carbon dioxide are allowed to build up, then the animals will be weakened and therefore made susceptible to infection on that account. On the other hand, too porous a filter might admit pathogens carried on dust or dander.

Attempts have been made to localize the filter material to certain areas of a box-like filter cover, for example, as shown in European published application No. 36,628 dated Sept. 30, 1981, and U.S. Pat. No. 4,480,587—Sedlacek. Both teach inverted box covers in which only the bottom of the inverted box includes filter material. These devices are characterized by limited filter surface area and necessarily require a relatively open mesh of filter material or very frequent changing to offset the relatively smaller surface area that is open to air flow. With a high performance close-fiber filter, particularly with time, ammonia and carbon dioxide build up in the cages.

Many attempts have been made to develop laminar flow ventilation of cages to preclude the need for filters. The idea is to develop a moving mass of air in which all portions move in parallel over the cages. Laminar flow has not proved practical because any obstruction disturbs the flow, causing eddies and spreading dust and dander.

In cage systems with downwardly-directed box-like filter covers or bonnets, eddy currents in the cage and in the area of the cage are the driving force for causing passage of air to and from the cage enclosure. These eddy currents are substantially caused by thermal currents from the body heat of cage occupants. In U.S. Pat. Nos. 4,343,261—Thomas; 4,085,705—Gland et al.; and 4,249,482—Harr; cage systems are disclosed in which the cage boxes are mounted under the shelves rather than on top of the shelves, the open tops of the cages being directed against the underside of the shelves. The shelves are provided with integral ducts for at least supply or exhaust of air, a flow being driven to or from the room around the cage/shelf interface. Preferably ducts are included for balanced driving of both supply and exhaust. The shelves are internally lengthwise divided into supply and exhaust ducts, holes to the ducts in the bottom walls of the shelves being encompassed by the open-topped cages, whereby powered air supply and/or exhaust means blow clean fresh air into the cages and exhaust carbon dioxide and fumes.

When open-topped cages are removed from the rack, the occupants are exposed. The aforesaid patent to Thomas teaches a cage cover with integral valves. The cover may be sealably placed over the opened top of the cage and the valves opened by contact with the shelf. When the cage is withdrawn from the rack, upwardly-biased movably bodies in the valves are freed and the valves close automatically. The cage is then sealed airtight. The occupants of the cage are isolated, but the cage is not ventilated. A filter pad may be mounted in each valve, the filter pad being operative only when the valve is open due to pressure against the shelf.

The present invention seeks to achieve the isolation benefits of a covered cage system and also the full ventilation benefits of a powered individually-ventilated cage rack. A filter cover is disclosed that is sealably affixed to the cage and is flat enough to fit between the lower face of a shelf and the opened top of a cage suspended below the shelf. The filter is mounted to a resilient frame adapted to sealably rest around the free standing edges of the open wall of the cage. The filter panel functions as an air seal with the shelf as well as a filter cover for the cage. The filter cover prevents passage of dust and dander between the rack and the cage. When the cages are removed from the rack, they remain safe from air-borne contagion and are at least partly ventilated in a similar manner to inverted box filter bonnets. The system further comprises a service and isolation enclosure producing a downward flow of clean, filtered air over a service area, whereby cages removed from the rack can be opened in the safety of the servicing unit, for changing cage bedding, food, water or occupants. Furthermore, the powered nature of the air flow in both the cage rack and in the service box provide adequate ventilation notwithstanding the relatively smaller surface area of the filter covers across only the opened tops of the cages, as opposed to the larger five wall structure of prior art inverted-box filter bonnets. When a cage is removed from the rack even after use, the filter panel is for the most part clean, any accumulations being restricted to the area of the filter panels aligned with the air holes under the shelves. In this manner, laboratory animals can be isolated from contagion and adequately ventilated at all stages of processing.

SUMMARY OF THE INVENTION

It is an object of the invention to maximize both ventilation and protection from contagion in a high density laboratory animal housing system.

It is another object of the invention to achieve the isolation benefits of filter covers for air-impervious cages and the ventilation benefits of positive individual cage ventilation, without adding unduly to the expense and/or mechanical complication of cage racks.

It is also an object of the invention to provide an integrated system including all the necessary elements for isolating laboratory animals from one another and from possibly-contaminated air either in the laboratory area or in the cage, throughout the confinement of the laboratory animals.

It is still another object of the invention to achieve the foregoing benefits in a high density, high volume laboratory animal housing system, including conveniences and safety features for handling of the apparatus, cleaning the apparatus and disposal of waste.

These and other objects are accomplished by an animal housing and service system of the type having impervious cage boxes suspended on brackets below internally-ducted shelves. The open tops of the cage boxes are provided with thin foraminous filter panels having frames sealingly disposed over the open tops of the cage boxes, the filter panels remaining in position when the boxes are mounted in the shelves and when the boxes are removed for transport. An independently-ventilated mobile service enclosure is provided for receiving cage boxes, the service enclosure having air direction panels adapted to achieve a downward flow across the cages to be serviced and an isolating air curtain at the opening to the enclosure. By keeping the filter panels in place on the cages except when a cage is in the service enclosure, the system achieves the powered ventilation benefits of the ducted-shelf mounting means and the positive isolation from pathogens of filter covers.

BRIEF DESCRIPTION OF THE DRAWINGS

There are shown in the drawings the embodiments which are presently preferred. It should be understood, however, that the invention is not limited to the precise arrangements and instrumentalities shown in the drawings, and furthermore that the invention is subject to combinations of the disclosed features in various additional groupings.

DETAILED DESCRIPTION OF THE PREFERRED EMBODIMENTS

Figure 1:
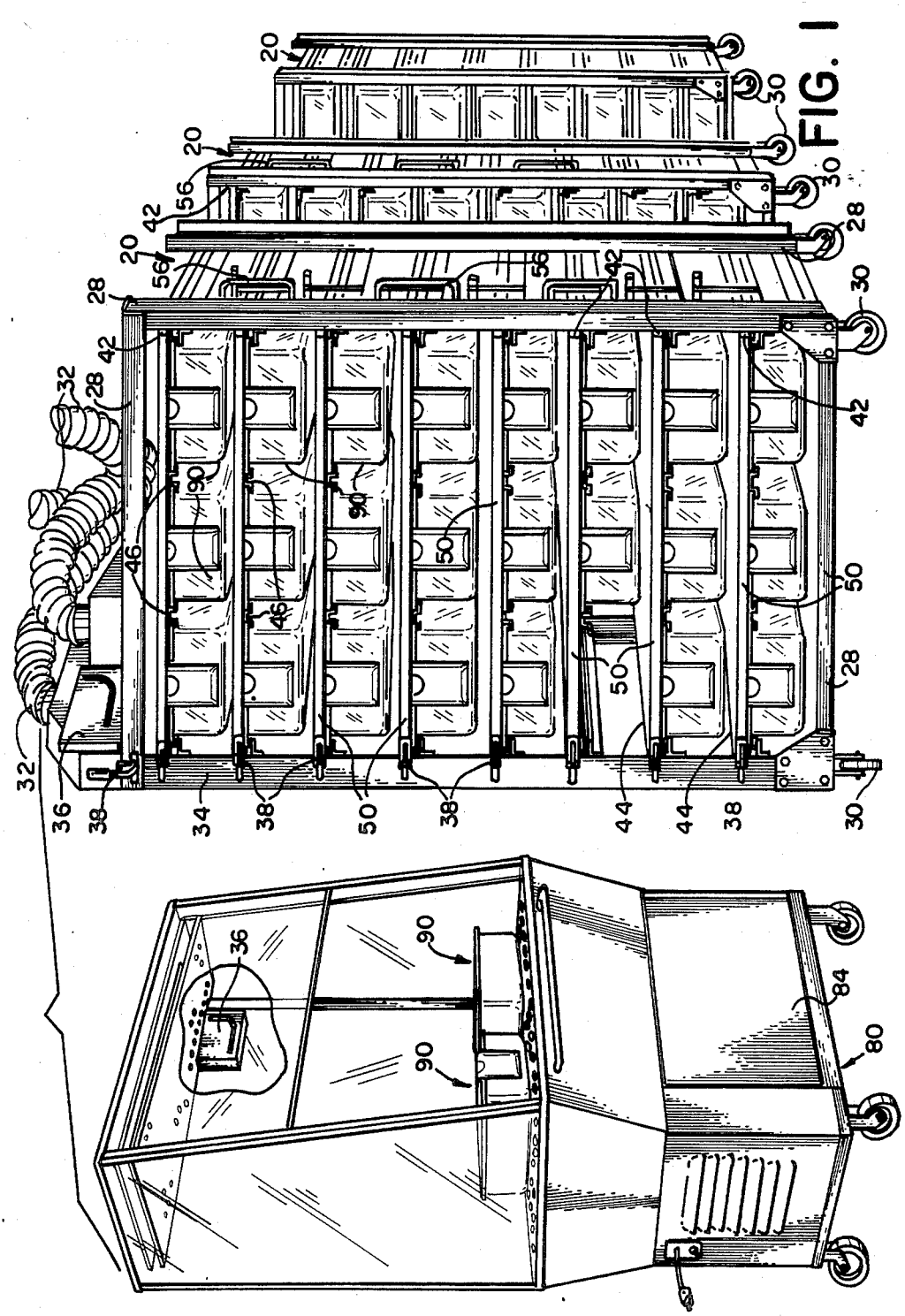
FIG. 1 is a perspective view of an animal housing and maintenance system according to the invention.

The overall animal housing and maintenance system of the invention is shown in FIG. 1. Laboratory animals such as mice, rats, rabbits or the like are confined in individual cage enclosures 90 which are mounted in very close proximity on racks 20, a plurality of which are kept in the laboratory, and attached to ventilation supplies, and optionally water supplies, using air hoses 32 and water pipes 56, respectively. Alternatively, water pipes 56 can be replaced with water bottles in the individual cages. The ventilation supplies can be individual fan and filter units as in U.S. Pat. No. 4,343,261—Thomas, the disclosure of which is hereby incorporated. Alternatively, large scale fan and filter units can supply air to a roomful of cage racks by means of permanently-mounted ducts.

Each cage 90 is a five-walled box with a filter panel disposed across the open wall. The walls of the box are made of an air-impervious, preferably-transparent material such as polycarbonate plastic. The top of each cage 90 is directed upwards against the underside of shelves 50, which are internally lengthwise ducted and connected to supply and/or exhaust air to the cages 90. The shelves 50 are in air communication with a ducted plenum 34 at the end of the rack, against which the shelves are urged by bale clips 38. The overall shelf and plenum structure is supported by braces 28, which comprise the upper and lower horizontal members and the vertical and horizontal shelf-supporting members on the end opposite the plenum 34.

The entire shelf and plenum apparatus can be conveniently disconnected and disassembled for cleaning, without tools. Bale clips 38 are provided for the removal of each shelf 50, the disconnection of the air manifold communicating with air lines 32, and the removal of end plenum 34. Casters 30 are provided to make the shelf unit mobile at least within a certain range defined by air lines 32 when attached, and the range of any connection (not shown) attaching water lines 56 to a water supply.

Individual cages 90 are removed from their respective shelves by sliding them out along inverted U-shaped brackets 46. Brackets 46 have flanges spaced from the shelves and directed toward the cages. The flanges rest under complementary mating flanges of the cages, holding the cages against the underside of the shelves. The cages 90 are removed together with their filter covers, and serviced within the protection of the transparent upper enclosure 82 of service apparatus 80, known as a change box.

Service apparatus or change box 80 has a self-contained ventilation system having a fan and filter in the lower cabinet area 84, providing a supply of clean filtered air which is routed up side conduit and then aimed downwardly through the cage servicing area by means of two air directing panels at the top of transparent top 82. An upper one of the panels has one slot running the width of the service are, for equalizing pressure across the top of unit 80. A lower one of the panels has perforations or bores in sizes and orientations to achieve a substantially laminar downward flow. Manometers 36 are used to control the extent of air flow in change box 80 and also in the rack 20 by measuring pressure differences between inlet and outlet or between either of the inlet and outlet and atmospheric pressure in the area.

It is not practically possible to absolutely prevent any leakage of air whatsoever in a ventilation system having removable components. Nevertheless, the present invention is characterized by structural supports and seals that minimize leakage at all points of attachment. The connection between end plenum 34 and each of the shelves 50 is in each case made over a seal member 44, the shelf 50 being urged toward end plenum 34 over seal 44. Shelves 50 have internal ducts that align to connect with internal ducts running vertically in end plenum 34. Seals 44 have openings to allow air to pass between shelves 50 and the ducts of end plenum 34, mechanical clasps or bale clips 38 pressing shelves 50 down on seals 44. At the opposite end of shelves 50, end plugs 42 prevent any leakage in or out of the ventilation system.

Figure 5:
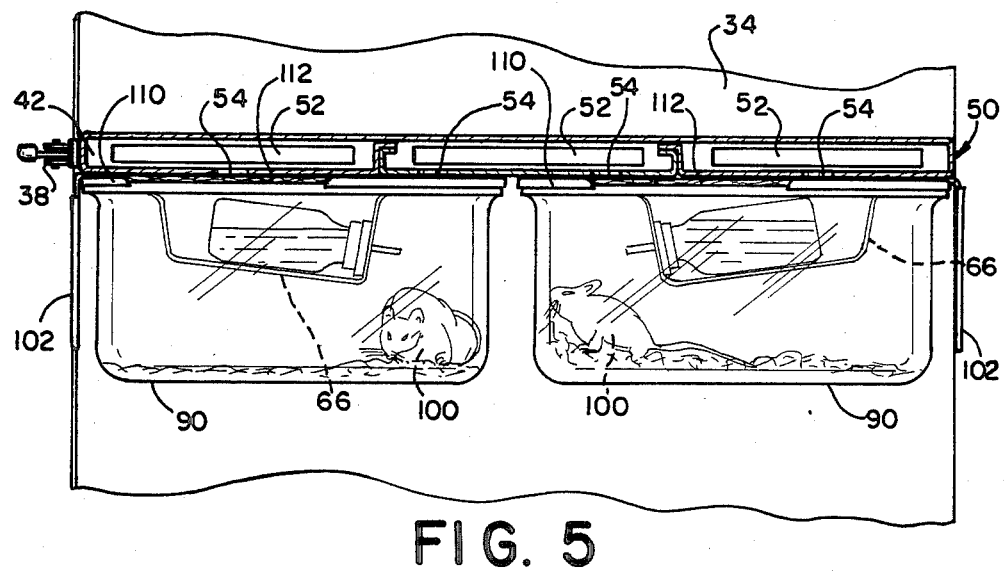
FIG. 5 is a partial section view through one of the shelves in FIG. 1, viewed toward the left.

FIG. 5 shows a cross section of an individual shelf 50, viewed toward end plenum 34, cages 90 being shown supported below the shelf. Each of the shelves 50, and the end plenum 34, have sheet metal webs defining separate ducts for supply and/or exhaust to the cages 90 suspended below the shelves. The supply and exhaust through air lines 32 is driven by at least one fan (not shown), such that a positive flow of air constantly washes through each cage 90. The ducts defined in the shelves align with openings 52 connecting through to end plenum 34, the shelf 50 being urged down on end seal 42 by the bale clips 38.

Figure 2:
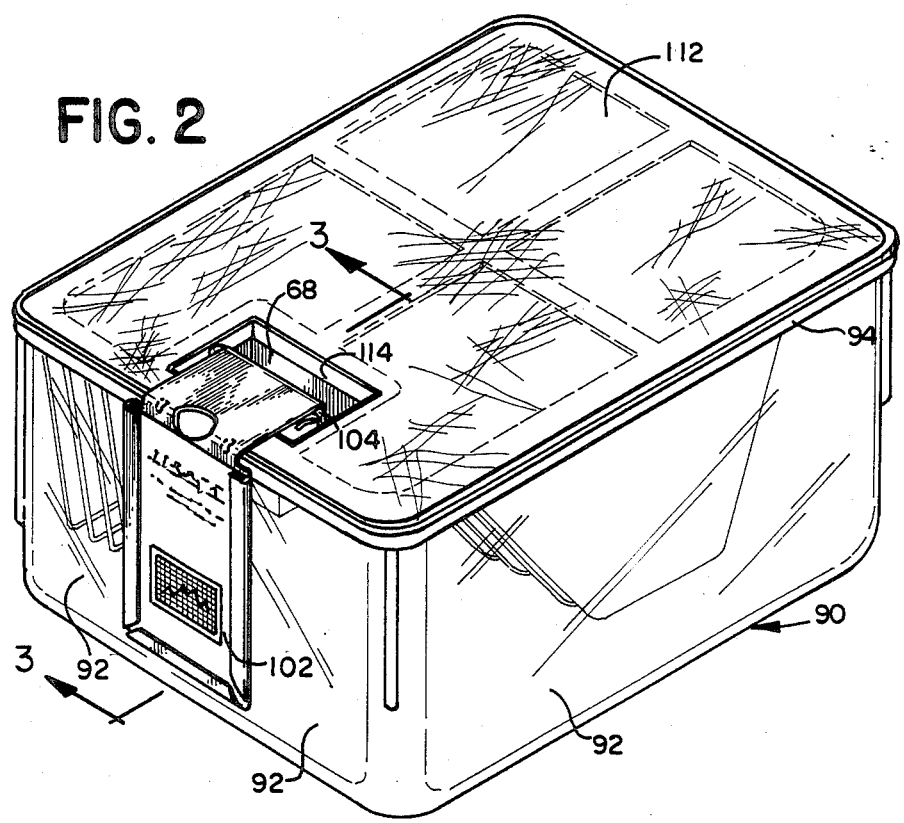
FIG. 2 is a perspective view of a single cage, removed from the rack.
Figure 3:
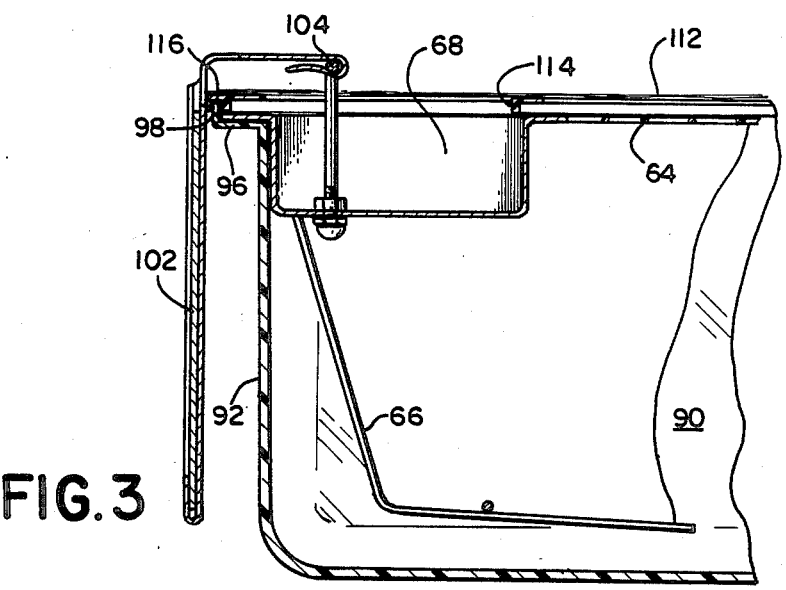
FIG. 3 is a detailed section view taken along lines 3—3 in FIG. 2.

Cages 90 are physically mounted to shelves 50 by U brackets 46. Each cage 90, as shown in FIGS. 2 and 3, has a flange 94 around its open top, which defines a flat plane. The remaining walls 92 of cage 90, including the vertical walls and the bottom, are impervious to air, preferably being made of a transparent polycarbonate plastic or the like, providing light to the cage occupants and also giving an opportunity to visually monitor the occupants'3 activities. Flanges 94 have, in cross section, a standing portion 98 terminating in an upwardly-oriented free end, and a horizontal portion 96, which is urged upwardly toward the shelf from outside the cage by pressure of the flanges of U-brackets 46 (see FIG. 1). The flanged edges of cages 90 provide a step-like surface within the cage to receive a confining panel 64, which may have bars, a metal perforated structure or the like. Confining panel 64 is necessary to prevent the occupants from gnawing on or destroying filter material 112 in filter panel 110 or from damaging the shelves. Occupants 100 of the cages 90 are also supplied with food, and possibly water by limited access through the confining panel 64 and grid work 66 thereof. Panel 64 with grid 66 rests on the horizontal inward surface of the cage flanges, holding food and water within reach of occupants 100.

Figure 4:
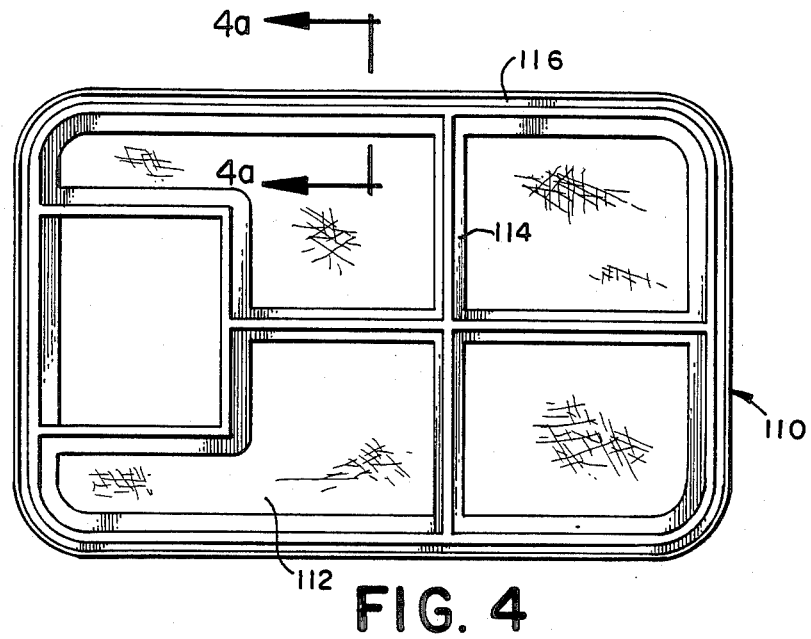
FIG. 4 is an elevation view of the filter panel according to the invention.

Filter panel 110 is pressed between cage 90 and shelf 50. Filter panel 110 is shown in FIG. 4, as viewed from the side to be directed toward the cage. A frame member 114 of glass-fiber-filled polypropylene is bonded onto a nonwoven sheet of polyester fibers, forming a tough but air-porous cover that encloses over the top of each cage 90. The frame portion 114 is molded around its outside edge to define a groove 116 which fits over and engages the free end of flange 94 of each cage 90.

Referring to FIGS. 2 and 3, filter panel 112 defines a smooth, flat upper portion for the cage 20 disposed substantially in the same plane occupied by the upper edge, i.e. the open part, of cage 90. The thickness of the flanged edge of cage 90 is increased only slightly by the thickness of frame member 114 in the vicinity of groove 116 (See FIG. 3). Moreover, this additional thickness functions primarily as a seal when the cage is inserted under a shelf 50, the filter panel and sheet metal shelf conforming to the available space.

An opening 68 is preferably formed in the filter panel for access to a handle member 104 on the confining panel 64. The handle 104, which also serves as a point of attachment for label support 102, allows the user to manipulate the cage and its cover without ever touching the underside of the filter panel. Filter panel 110 is quite tough and it is difficult to damage the foraminous sheet 112 thereof in normal manual handling. Nevertheless, handle 104 avoids the possible problem of disturbing the attachment of the frame portion 114 from flange 94. The sheet metal portion of label holder 102 that extends over the top portion of the cage is also quite thin. This part likewise does not appreciably increase the height of the cage flange, and instead forms a point of frictional restriction that holds the cage in place when fully inserted under shelf 50.

Figure 6:
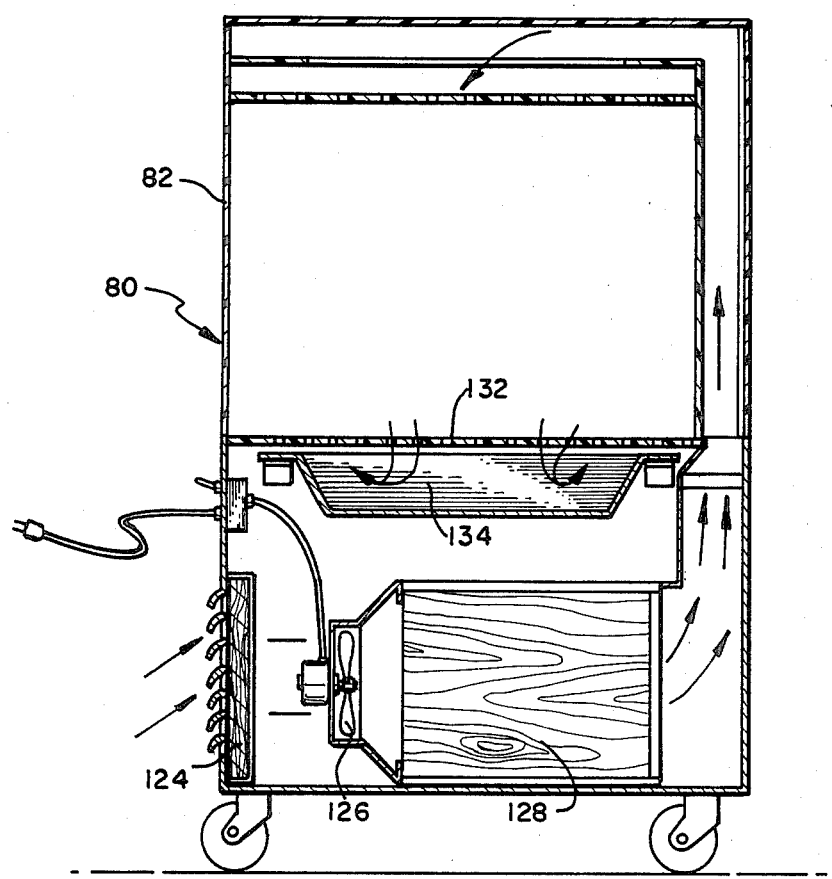
FIG. 6 is a section view in elevation through the service box 80 of FIG. 1.
Figure 4A:
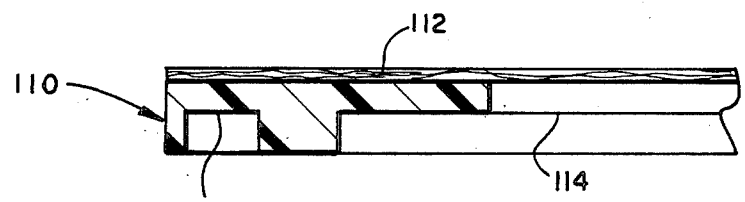
FIG. 4a is a section view taken along lines 4a—4a in FIG. 4.

The particulars of the service enclosure 80 are shown in FIGS. 1 and 6. As seen in FIG. 1, the cages 90 are to be serviced on a perforated work table 132. Perforated table 132 is disposed over a catch basin 134 as seen in FIG. 6. The basin 134 catches any solid material such as loose bedding that falls from cages 90. Catch basin 134 is mounted at a space below perforated table 132 so that air is free to pass around basin 134 to the lower part 84 of service enclosure 80. In this manner, air can be directed downwardly through table 132, and possibly recirculated. It is possible to provide an external air inlet, preferably with a prefilter in the form of a large-particle filter 124. The air coming down through perforated table 132 and/or incoming air through particle filter 124 is forced by blower 126 through HEPA filter 128. HEPA filter 128 is a cartridge that can be affixed sealably in the flow path from fan 126 to provide class 100 clean air. The output of the HEPA filter, which is free of dust and dander, is carried through duct along the side of the upper or clear portion 82 of service unit 80, to a pair of air-distributing panels. An upper panel is narrowly slotted across the width of top 82, causing air coming along the ducts to be evenly distributed at more-or-less equal pressure across the whole width of the work area, even though the supply duct is at one side. Without such a member, more air would flow at the side closer to the incoming air duct, and less at the opposite side.

The air passing the upper panel with its distributing slot is directed downwards by means of the next panel, which is perforated. The perforated panel has holes of varying diameter and orientation. Inasmuch as the rear wall of top 82 is vertical and the front wall is slanted for viewing, it is necessary to direct slightly more air towards the front and relatively less towards the back in order to achieve a downward flow free of turbulence adjacent the access opening for cages 90. Accordingly, holes in the distributing panel adjacent the rear part of top 82 are small vertical holes, and the holes towards the front of top 82 become progressively larger and progressively more slanted to the front, the front-most holes being substantially parallel to the slanting front wall of top 82. The particular proportion of larger and/or slanted holes will reflect the extent of slant of the front wall of top 82. With the unit shown, the holes are proportioned and oriented in zones. The rear fifty percent are preferably small and vertical; the next twenty five percent are small and tilted; and the front twenty five percent are large (e.g., 1.5 times the smaller diameter) and are tilted. This distribution towards the front results in an air curtain passing downwardly across the front opening, preventing any incoming contagion.

Each of the shelf units 20 and the service unit 80 is provided with casters 30 for some mobility. The fan 126 may be powered from an onboard battery in unit 80, but preferably a cord for powering unit 80 from a wall receptacle is provided. This cord can have a spring-winding spool mechanism for convenience.

A number of variations on the invention are possible within the scope and spirit thereof. Units are possible with fewer hollow shelves, for example even one hollow shelf, carrying air in an internally-defined duct. The duct can be single duct adapted to force air into the cage, provided some leakage is allowed back through the filter panel and along the shelf around the edges of the cage by virtue of a loose fit between the top of frame 114 and the bottom of shelf 50. Preferably, however, the duct is fitted such that the frame 114 functions substantially as a seal. In that case, it is necessary to provide ducted openings in shelf 50 for supply and for exhaust. Of course only one need be driven.

Other means are possible besides U-shaped brackets 46 for removably holding the cages against the shelf while causing the cages to encompass at least one air opening under the shelf. In each case, a filter panel with a foraminous filter material is disposed across the open wall of the cage such that when the cage is removed from the shelf, the occupants are protected from dander, dust and air-borne contagion. In this manner, the occupants of the cages are pathologically isolated when the cages are held against the shelf and also when the cages are removed from the shelf.

The system of the invention positively directs a flow of air against the foraminous sheet 112 of filter panel 110, when the cage is being serviced and also when the cage is in place in the rack. Nevertheless, for efficiency, and for long filter life, it is preferable that the portion of the area of filter panel devoted to the foraminous sheet 112 be maximized, and that the area of frame 114 be minimized insofar as possible. The foraminous sheet is preferably a flexible but self-supporting sheet, for example spunbonded polyester as sold under the trademark Reemay by the DuPont Company, Wilmington, Del. This material bonds well with the glass-fiber-filled polypropylene material of frame 114, which encloses over the free edge of the cage flange. The Reemay foraminous sheet is available in a series of weights (0.5–6.0 oz. per square yard, i.e., 0.02–0.25 gm/m$^2$) and in both straight and crimped fibers. The heaviest of weights is most effective for filtering, but also will need most frequent changing. Filter panels using Reemay foraminous sheets throughout the available range are useful for varying filtering performance demands.

The service enclosure 80 as shown has an opening at the lower part of the transparent top 82. It is also possible, and may be preferable in some cases, to provide an openable door (not shown) for the bottom part of top 82, such that top 82 can be closed by the door and used as a protected enclosure even when fan 126 is not operating. An operator intending to change the bedding, food or occupants of cages 90 can latch open the door, load the service unit 80 with a supply of clean cages with clean bedding, and after closing the door wheel the unit 80 to the area of racks 20. The fan is then operated and the door latched open for servicing cages one at a time. Normally, such servicing will involve manually transferring occupants from the used cage to the clean cage, adding food, and installing a new filter top. All operations requiring the opening of the cage can be conducted within the protection of top 82 of service unit 80.

Service unit 80 is shown with an air flow path defined through particle filter 124 and also with a circulating air flow through perforated table 132. It is also possible to duct service box 80 such that the inlet to filter 124 is closed can manually be closed, whereupon the air circulates within the space, some air being drawn into the unit through the front access opening in top 82. It is also possible to provide an outlet duct for air passing through perforated table 132, and to supply the fan 126 only through particle filter 124, or through louvers or like fenestrations of the casing in the area of fan 126. In that case, an additional panel (not shown) would be required to define a duct from the outside air to fan 126.

The invention having been disclosed, a number of additional variations will now be apparent to persons skilled in the art. Reference should be made to the appended claims rather than the foregoing specification as indicating the true scope of the invention.

What is claimed is:

1. An animal housing and maintenance system, comprising:
    at least one hollow shelf having at least one internal duct for carrying air, the at least one shelf being affixed to at least one of an air supply and an air exhaust, the at least one shelf having a plurality of spaced air openings on one side thereof, communicating with the at least one duct;
    a plurality of hollow cages removably mounted on the at least one shelf, each cage being a solid box with one open wall, the open wall being disposed toward the at least one shelf when the cage is mounted on the shelf, the cage encompassing at least one of said spaced air openings;
    means for removably holding the cages in position against the at least one shelf;
    a filter panel disposed across each said open wall, the filter panel having a foraminous sheet for enabling air flow and a frame for engaging the cage around a periphery of the open wall, the frame being affixed to the foraminous sheet;
    whereby occupants of the cages are pathologically isolated when the cages are held against the at least one shelf and also when the cages are removed form the at least one shelf.

2. The system of claim 1, wherein the hollow cages are substantially-rectilinear boxes, the open wall being one of six mutually-perpendicular walls, and wherein the foraminous sheet occupies at least 70% of said open wall.

3. The system of claim 1, wherein the open wall has a free edge around a periphery thereof and the frame of the filter panel engages over the free edge.

4. The system of claim 1, further comprising a service enclosure for receiving cages removed from the at least one shelf for service, the service enclosure having means for at least partly enclosing a cage to be serviced and independent ventilation means for pathologically isolating the cage to be serviced, whereby the occupants of the cage can be continuously pathologically isolated by removing the filter panel only within the service enclosure.

5. An animal cage for use in a positively-ventilated multiple cage rack, the rack having spaced hollow air-carrying shelves with a plurality of air openings therein and brackets for holding cages against the air openings, the cage comprising:

an impervious box having a single open wall;

a flange around a periphery of the open wall, the flange having a support part parallel to a plane of the open wall and a standing part perpendicular to the plane of the open wall, the support part of the flange being engaged by the brackets when the cage is in the rack, the standing part of the flange having a free standing edge;

a filter panel removably positioned on the support part, the filter panel having a foraminous part open to passage of air and a frame part affixed to the formainous part, the frame part engaging over the standing part of the flange, the filter panel being positioned substantially in the plane of the open wall such that the filter panel is held between the free edge and the hollow air carrying shelves when the the cage is inserted in the rack.

6. The cage of claim 5 further comprising a confining panel fittable on the support part of the flange, the confining panel being open to passage of air and effective to resist access by the occupants to the filter panel.

7. An animal cage for use in a positively-ventilated multiple cage rack, the rack having spaced hollow air-carrying shelves with a plurality of air openings therein and brackets for holding the cage against the air openings, the cage comprising:

an impervious box having a single open wall; a flange around a periphery of the open wall, the flange having a support part parallel to a plane of the open wall and a standing part perpendicular to the plane of the open wall, the support part of the flange being engaged by the brackets when the cage is in the rack, the standing part of the flange having a free standing edge;

a confining panel fittable on the support part of the flange, the confining panel being open to passage of air and effective to resist passage by cage occupants, the confining panel having at least one of a water supply means and a food supply means, the confining panel also having a handle directed toward the shelf; and, a filter panel removably positioned on the support part, the filter panel having a foraminous part open to passage of air and a frame part affixed to the foraminous part, the frame part engaging over the standing part of the flange, the filter panel being positioned substantially in the plane of the open wall such that the filter panel is held between the free edge and the hollow air carrying shelves when the cage is inserted in the rack, the filter having an opening providing access to the handle of the confining panel.

8. The cage of claim 7, wherein the handle is recessed in the confining panel, the handle having an upper most part disposed in the plane of the open wall, and further comprising a label holder having a sheet metal clip attachable to the handle, the label holder extending between the filter panel and shelf when the cage is inserted in the rack.

9. An animal housing and maintenance system, comprising:

an isolation box having means defining an at least partially closed service space and ventilation means communicating with the service space, the service space receiving at least two animal cages, whereby at least one of the occupants, bedding, food and water can be transferred in an enclosed space;

a positively-individually-ventilated cage rack having internally-ducted air carrying shelves attached to at least one of an air supply and an air exhaust, the shelves having openings communicating with respective internal ducts for powering ventilation through the openings;

a plurality of animal cages having impervious rectilinear walls and a single open wall, the cages being mountable on the rack such that the open wall is directed to the openings in the shelves; and, a plurality of filter panel covers for the cages, the filter panel covers being disposed across the open wall of the cages, and removable from the rack together with the cages, the filter panel covers being thin foraminous sheets, the sheets being compressible between the cages and the rack, whereby occupants of the cages are isolated from pathogens while mounted in the rack and while removed from the rack.

10. The system of claim 9, wherein the isolation box has a hood connected by at least one duct to a power ventilation means including a filter, the hood having an air-distribution panel supplying air to the service space and perforated support surface for extracting air from the service space.

11. The system of claim 10, wherein the air distribution panel includes a slotted panel and a perforated panel, the perforated panel having holes of varying diameter and varying axial orientation.

12. An animal housing and maintenance system, comprising:

an isolation box having means defining an at least partially closed service space and ventilation means communicating with the service space, the service space receiving at least two animal cages, whereby at least one of occupants, bedding, food and water can be transferred in an enclosed space;

a positively-individually-ventilated cage rack having internally-ducted air carrying shelves attached to at least one of an air supply and an air exhaust, the shelves having openings communicating with respective internal ducts for powering ventilation through the openings;

a plurality of animal cages having impervious rectilinear walls and a single open wall, the cages being mountable on the rack such that the open wall is directed to the openings in the shelves;

a plurality of filter panel covers for the cages, the filter panel covers being disposed across the open walls of the cages and removable from the rack together with the cages, the filter panel covers being thin foraminous sheets, the sheets being compressible between the cages and the rack;

the isolation box having a hood connected by at least one duct to a power ventilation means including a filter, the hood having an air-distribution panel supplying air to the service space and a perforated support surface for extracting air from the service space, the air distribution panel including a slotted panel and a perforated panel, the perforated panel having holes of varying diameter and varying axial orientation, the service space having a transparent front panel and an opening at a lower part thereof, the perforated panel having larger holes adjacent to the front panel and the perforated panel having holes oriented to direct air toward the front panel.

* * * * *